United States Patent [19]

Schütze et al.

[11] 4,179,450
[45] Dec. 18, 1979

[54] PROCESS FOR THE PREPARATION OF 1-ACYLAMINO-5(8)-CHLOROANTHRAQUINONES

[75] Inventors: Detlef-Ingo Schütze, Bergisch-Gladbach, Fed. Rep. of Germany; Hans-Samuel Bien, deceased, late of Burscheid, Fed. Rep. of Germany, by Else Bien, Gabriele Bien, Dorothee Bien, legal representatives; Petra Bien, heir; Daniel Bien, heir, both of Burscheid, Fed. Rep. of Germany.

[73] Assignee: Bayer Aktiengesellschaft, Leverkusen, Fed. Rep. of Germany

[21] Appl. No.: 794,143

[22] Filed: May 5, 1977

[30] Foreign Application Priority Data

May 8, 1976 [DE] Fed. Rep. of Germany ....... 2620372

[51] Int. Cl.² ................. C07C 97/24; C07C 103/75
[52] U.S. Cl. ................................. 260/377; 260/381
[58] Field of Search ............... 260/377, 381, 691, 379, 260/382

[56] References Cited

U.S. PATENT DOCUMENTS

| | | | |
|---|---|---|---|
| 1,923,618 | 8/1933 | Groggins | 260/382 |
| 2,224,112 | 12/1940 | Krzikalla et al. | 260/379 |
| 2,614,108 | 10/1952 | Jenny et al. | 260/377 |
| 2,720,533 | 10/1955 | Jenny et al. | 260/381 |

FOREIGN PATENT DOCUMENTS

| | | | |
|---|---|---|---|
| 66731 | 12/1913 | Fed. Rep. of Germany | 260/381 |
| 549137 | 11/1928 | Fed. Rep. of Germany | 260/381 |
| 312289 | 5/1929 | United Kingdom | 260/381 |
| 226068 | 5/1968 | U.S.S.R. | 260/379 |

*Primary Examiner*—Allen B. Curtis
*Assistant Examiner*—Raymond Covington
*Attorney, Agent, or Firm*—Sprung, Felfe, Horn, Lynch & Kramer

[57] ABSTRACT

The invention relates to a novel process for the preparation of 1-acylamino-5(8)-chloroanthraquinones, which are starting materials for the preparation of vat dyes. It is characterized in that 1,5(8)-dichloroanthraquinones is reacted with ammonia at temperatures of 190° to 240° C., the amino groups in the reaction mixture are completely acylated and the more sparingly soluble diacylaminoanthraquinone is separated off from the more readily soluble monoacylaminochloroanthraquinone.

The new process yields reaction products which are purer and cheaper than those which are obtained by conventional methods. Moreover there are smaller waste water problems.

10 Claims, No Drawings

PROCESS FOR THE PREPARATION OF 1-ACYLAMINO-5(8)-CHLOROANTHRAQUINONES

The subject of the invention is a new process for the preparation of 1-acylamino-5(or -8)-chloroanthraquinones, especially 1-aroylamino-5(or -8)-chloroanthraquinones.

It is already known to obtain these compounds, which are direct starting materials for the preparation of valuable vat dyestuffs, by acylation of corresponding aminochloroanthraquinones (compare German Pat. No. 225,232).

However, the method has not been able to find any acceptance in large-scale industrial production since 1-amino-5(8)-chloroanthraquinones which are pure or at least enriched are accessible only with difficulty. For example, when 1,5(8)-dichloroanthraquinone is reacted with at least 14% strength aqueous ammoniac at temperatures of 130° to 170° C., mixtures of monoaminoanthraquinones and diaminoanthraquinones, as well as relatively large amounts of the unchanged starting material, are formed (compare German Pat. No. 549,137) and these can be separated only with difficulty and in unsatisfactory yields by recrystallisation from sulphuric acid (compare ibid. and (Swiss patent application No. 140,412).

Therefore, only the conversion of 1-benzoylamino-5-aminoanthraquinone into the corresponding 5-chloro derivative by diazotisation and a subsequent Sandmeyer reaction has achieved industrial significance hitherto for the preparation of the title compounds (compare Ullmanns Encyklopädie der techn. Chemie (Ullmann's Encyclopaedia of Industrial Chemistry), 4th edition, volume 7, page 600). However, because of the generally known disadvantages of the Sandmeyer reaction, even this process is in no way to be regarded as optimal.

It has now been found that 1-acylamino-5(8)-chloroanthraquinones are obtained in a relatively simple manner and comparatively high purity when 1,5(8)-dichloroanthraquinone is reacted at temperatures of 190° to 240° C., and preferably of 200°-220° C., with aqueous ammonia, the amino groups in the reaction mixture are completely acylated and the diacylaminoanthraquinone, which is sparingly soluble in organic solvents, is separated off from the more readily soluble monoacylaminochloroanthraquinone.

The concentration of ammonia in the aqueous medium in which the first stage of the process is carried out can be varied within wide ranges. It is preferably 5-8%. Advantageously, the ammonia, which at the same time serves as an acid acceptor, is employed in excess.

In general, 2-10 mols of $NH_3$ per halogen atom to be exchanged are expected.

Compared with the reaction products obtainable by known methods of amination, the reaction mixtures obtained from the first stage of the process according to the invention are distinguished by a relatively high content of monoaminochloroanthraquinone and a small content of unconverted starting material.

In general, these mixtures have the following composition: 50-60% of monoaminochloroanthraquinone, 30-40% of diaminonoanthraquinone and 2-5% of dichloroanthraquinone.

The acylation of these mixtures is carried out in a manner which is in itself known (compare German Pat. No. 225,232, mentioned above) in the presence of inert organic solvents.

Appropriately, 3-10 parts of solvent and at least 1 equivalent of the acylating agent are employed per 1 part of the amination mixture.

The acylation temperatures are 100°-180° C.

Suitable solvents are nitrobenzene, toluene, chlorobenzene, dichlorobenzene, pyridine and the like.

Suitable acylating agents are benzoyl chloride and its $C_1$-$C_4$-alkyl, $C_1$-$C_4$-alkoxy, $CF_3$ and halogen (preferably chlorine) derivatives as well as acid chlorides and anhydrides of lower fatty acids. Benzoyl chloride is preferred.

When the acylation has ended, the diacylaminoanthraquinone, which as a rule is sparingly soluble, is separated off, for example by filtration, the separation being carried out at room temperature or at higher temperatures depending on the nature and amount of the solvent employed. The desired 1-aroylamino-5(8)-chloroanthraquinone is isolated from the filtrates by concentrating, evaporating or diluting with suitable precipitants—preferably approximately equal volumes of an alcohol (preferably methanol).

It must be regarded as extremely surprising that it is possible, with the use of simple reaction steps which are in themselves known to achieve a separation, which is adequate for industrial purposes, of the two main components of the reaction mixture, which is composed of numerous constituents, by skillful utilisation of the various solubility effects.

Apart from the advantages already mentioned, the new process is distinguished, compared with known processes, by the smaller load on the effluent and a lower number of reaction stages. Moreover, the diacylaminoanthraquinones which are obtained as by-products can be worked up by saponification to give diaminoanthraquionones—which are also valuable dyestuff intermediate products.

DESCRIPTION OF THE EXPERIMENTS

A. Reaction of chloroanthraquinones with ammonia

Example 1

83 g of 1,5-dichloroanthraquinone (95%; technical grade product) are heated in an autoclave with 100 ml of a 25% strength ammonia solution/300 ml of water for 7 hours at 210°, whilst stirring well. After letting-down, the product is filtered off, washed with water until neutral and dried.

This gives 73.4 g of a mixture of the following composition: 53.7% of 1-amino-5-chloroanthraquinone, 36.3% of 1,5-diaminoanthraquinone and 2.0% of 1,5-dichloroanthraquinone.

This corresponds to a yield of 54% of 1-amino-5-chloroanthraquinone and 39.5% of 1,5-diaminoanthraquinone.

Example 2

83 g of 1,5-dichloroanthraquinone (95%; technical grade product) are heated in an autoclave with 150 ml of a 25% strength ammonia solution/250 ml of water for 6 hours at 200° C., whilst stirring well. After letting-down, the product is filtered off, washed with water until neutral and dried.

This gives 74.2 g of a mixture of the following composition: 52% of 1-amino-5-chloroanthraquinone, 35% of 1,5-diaminoanthraquinone and 5% of 1,5-dichloroanthraquinone.

This corresponds to a yield of 53% of 1-amino-5-chloroanthraquinone and 38.5% of 1,5-diaminoanthraquinone.

Example 3

83 g of 1,5-dichloroanthraquinone (95% strength; technical grade product) are heated in an autoclave with 100 ml of a 25% strength ammonia solution/300 ml of water for 4 hours at 220° C., whilst stirring well. After letting-down, the product is filtered off, washed with water until neutral and dried.

This gives 73.4 g of a mixture of the following composition: 51.6% of 1-amino-5-chloroanthraquinone, 36.5% of 1,5-diaminoanthraquinone and 2.7% of 1,5-dichloroanthraquinone.

This corresponds to a yield of 51.8% of 1-amino-5-chloroanthraquinone and 39.7% of 1,5-diaminoanthraquinone.

Example 4

83 g of 1,8-dichloroanthraquinone (96% strength; technical grade product) are heated in an autoclave with 100 ml of a 25% strength ammonia solution/300 ml of water for 8 hours at 210° C., whilst stirring well. After letting-down, the product is filtered off, washed with water until neutral and dried.

This gives 73.8 g of a mixture of the following composition: 54.9% of 1-amino-8-chloroanthraquinone, 35.6% of 1,8-diaminoanthraquinone and 3.5% of 1,8-dichloroanthraquinone.

This corresponds to a yield of 54.7% of 1-amino-8-chloroanthraquinone and 38.3% of 1,8-diaminoanthraquinone.

Example 5

83 g of 1,8-dichloroanthraquinone (96% strength; technical grade product) are heated in an autoclave with 100 ml of a 25% strength ammonia solution/300 ml of water for 5 hours at 220° C., whilst stirring well. After letting down, the product is filtered off, washed with water until neutral and dried.

This gives 74 g of a mixture of the following composition: 53.5% of 1-amino-8-chloroanthraquinone, 35.7% of 1,8-diaminoanthraquinone and 3.0% of 1,8-dichloroanthraquinone.

This corresponds to a yield of 53.4% of 1-amino-8-chloroanthraquinone and 38.5% of 1,8-diaminoanthraquinone.

Example 6

83 g of 1,8-dichloroanthraquinone (96% strength; technical grade product) are heated in an autoclave with 150 ml of a 25% strength ammonia solution/250 ml of water for 6 hours at 200° C., whilst stirring well. After letting-down, the product is filtered off, washed with water until neutral and dried.

This gives 74.5 g of a mixture of the following composition: 57.1% of 1-amino-8-chloroanthraquinone, 32.9% of 1,8-diaminoanthraquinone and 5% of 1,8-dichloroanthraquinone.

This corresponds to a yield of 57.4% of 1-amino-8-chloroanthraquinone and 35.7% of 1,8-diaminoanthraquinone.

B. Benzoylation of the reaction product obtained according to A

Example 7

30 g of the reaction product obtained according to Example 1 are heated in 250 ml of nitrobenzene to 150° C. A solution of 23 ml of benzoyl chloride in 46 ml of nitrobenzene is added dropwise at this temperature. The mixture is then stirred for a further 15 minutes at 150° C. The product is then filtered off at room temperature and washed with 200 ml of nitrobenzene. After drying, 19 g of 1,5-dibenzoylaminoanthraquinone which contains about 1% of 1-benzoylamino-5-chloroanthraquinone are obtained. The mother liquor, which has been combined with the washing liquid, is evaporated to dryness.

The dried residue (24.5 g) contains 84.5% of 1-benzoylamino-5-chloroanthraquinone, 1.1% of 1,5-dibenzoylaminoanthraquinone and about 3% of 1,5-dichloroanthraquinone.

Example 8

30 g of the reaction product obtained according to Example 1 are heated in 90 ml of nitrobenzene to 150° C. 23 ml of benzoyl chloride are added dropwise at this temperature. The mixture is then stirred for a further 15 minutes at 150° C. The mixture is filtered at 120° C. and the residue is washed with 20 ml of nitrobenzene, which is at a temperature of 120° C. This gives 18.5 g of 1,5-dibenzoylaminoanthraquinone which contains 0.5% of 1-benzoylamino-5-chloroanthraquinone.

90 ml of methanol are added to the mother liquor, which has been combined with the washing liquid, and 1-benzoylamino-5-chloroanthraquinone crystallises out.

21.9 g, consisting of 89.6% of 1-benzoylamino-5-chloroanthraquinone, 3.3% of 1,5-dibenzoylaminoanthraquinone and 0.5% of 1,5-dichloroanthraquinone are obtained.

Example 9

30 g of the reaction product obtained according to Example 1 are heated in 200 ml of toluene to 100° C. A solution of 23 ml of benzoyl chloride in 46 ml of toluene is added dropwise at this temperature. The mixture is then stirred for 7 hours at 110° C. and filtered hot and the residue is washed with 200 ml of toluene (100° C.).

The residue (20.7 g) consists of 1,5-dibenzoylaminoanthraquinone which contains 0.5% of 1-benzoylamino-5-chloroanthraquinone.

The mother liquor and the toluene used for washing are evaporated to dryness. 23.6 g are obtained and contain 83% of 1-benzoylamino-5-chloroanthraquinone, 0.7% of 1,5-dibenzoylaminoanthraquinone and about 4% of 1,5-dichloroanthraquinone.

Example 10

20 ml of benzoyl chloride are added dropwise to 10 g of the reaction mixture obtained according to Example 1 in 100 ml of pyridine at 100° C. The mixture is then stirred under reflux for 1 hour. The product is filtered off at room temperature and washed with 100 ml of methanol. This gives 7.6 g of 1,5-dibenzoylaminoanthraquinone which contains 1.8% of 1-benzoylamino-5-chloroanthraquinone.

The mother liquor, which has been combined with the washing liquid, is diluted with 250 ml of water and the mixture is stirred for 1 hour at room temperature. It is then filtered and the product is washed with water and dried.

This gives 6.9 g, which contain 87.5% of 1-benzoylamino-5-chloroanthraquinone, 0.8% of 1,5-dibenzoylaminoanthraquinone and 1% of 1,5-dichloroanthraquinone.

Example 11

30 g of the reaction product obtained according to Example 1 are heated in 140 ml of o-dichlorobenzene to 125° C. and 23 ml of benzoyl chloride are added dropwise. The mixture is then stirred for 3 hours at 125° C. and filtered at 120° C. and the residue is washed with 200 ml of o-dichlorobenzene, which is at a temperature of 120° C.

The residue (20.3 g) consists of 1,5-dibenzoylaminoanthraquinone which contains 0.8% of 1-benzoylamino-5-chloroanthraquinone.

The washing liquid, which has been combined with the mother liquor, is evaporated to dryness.

The residue (24.7 g) contains 83.5% of 1-benzoylamino-5-chloroanthraquinone, 0.3% of 1,5-dibenzoylaminoanthraquinone and 4% of 1,5-dichloroanthraquinone.

Example 12

30 g of the reaction product obtained according to Example 4 are heated in 160 ml of nitrobenzene to 150° C. 23 ml of benzoyl chloride are added dropwise at this temperature. The mixture is then stirred for a further 15 minutes at 150° C. and filtered at 120° C. and the residue is washed with 200 ml of nitrobenzene.

The residue (18 g) consists of 1,8-dibenzoylaminoanthraquinone which still contains 1.5% of 1-benzoylamino-8-chloroanthraquinone.

The mother liquor, which has been combined with the washing liquid, is evaporated to dryness.

The residue (24.8 g) contains 85.4% of 1-benzoylamino-8-chloroanthraquinone, 2.1% of 1,8-dibenzoylamino-anthraquinone and 4% of 1,8-dichloroanthraquinone.

We claim:

1. In a process for the preparation of 1-acylamino-5-chloroanthraquinone or 1-acylamino-8-chloroanthraquinone by acylation of the corresponding monoaminochloroanthraquinone, the improvement comprising
   (a) aminating 1,5-dichloroanthraquinone or 1,8-dichloroanthraquinone with aqueous ammonia at temperatures from 190° C. to 240° C. to form a mixed amination product of the corresponding diaminoanthraquinone and at least 50% of the corresponding mono-(1)-aminochloroanthraquinone;
   (b) acylating the mixed amination product at a temperature from 100° C. to 180° C. in an inert organic solvent in which the acylated monoaminochloroanthraquinone is readily soluble and the acylated diaminoanthraquinone is sparingly soluble; and
   (c) separating the resultant monoacylaminochloroanthraquinone product from the diacylaminoanthraquinone product by recovery of the monoacylaminochloroanthraquinone product from the solvent.

2. Process according to claim 1, wherein 5–8% strength ammonia is employed.

3. Process according to claim 1, wherein benzoyl chloride is used as the acylating agent.

4. Process of claim 1 wherein the inert organic solvent is nitrobenzene.

5. The process of claim 1, wherein the monoacylaminochloroanthraquinone product is separated from the diacylaminoanthraquinone product by filtration of the organic solvent after cooling to 100°–130° C. to precipitate the diacylated product, followed by concentration of the filtrate containing the monoacylated product.

6. The process of claim 5, wherein the amination is carried out at a temperature of from 200° to 220° C.

7. The process of claim 1, wherein the ammonia is present in excess.

8. The process of claim 1, wherein the amination product is acylated with benzoyl chloride; a $C_1$–$C_4$-alkyl, $C_1$–$C_4$-alkoxy, $CF_3$, or halogen derivative of benzoyl chloride; or a lower fatty acid anhydride.

9. The process of claim 1, wherein the 1-acylaminochloroanthraquinone is a 1-aroylaminochloroanthraquinone.

10. The process of claim 1, wherein the product amination reaction mixture comprises from 50 to 60% of monoaminochloroanthraquinone, from 30–40% of diaminoanthraquinone and from 2 to 5% of unreacted dichloroanthraquinone starting material.

* * * * *